(12) United States Patent
Kurian et al.

(10) Patent No.: US 11,171,967 B2
(45) Date of Patent: Nov. 9, 2021

(54) E-CODE MULTI-IMPRINTS

(71) Applicant: Bank of America Corporation, Charlotte, NC (US)

(72) Inventors: Manu Kurian, Dallas, TX (US); Thomas J. Durkin, Chicago, IL (US); Linda Haddad, Concord, CA (US)

(73) Assignee: Bank of America Corporation, Charlotte, NC (US)

( * ) Notice: Subject to any disclaimer, the term of this patent is extended or adjusted under 35 U.S.C. 154(b) by 269 days.

(21) Appl. No.: 16/524,109

(22) Filed: Jul. 28, 2019

(65) Prior Publication Data
US 2021/0029135 A1    Jan. 28, 2021

(51) Int. Cl.
*H04L 29/06* (2006.01)

(52) U.S. Cl.
CPC .................... *H04L 63/12* (2013.01)

(58) Field of Classification Search
CPC ....... H04L 63/12; H04L 63/123; H04L 63/18; H04L 29/06
See application file for complete search history.

(56) References Cited

U.S. PATENT DOCUMENTS 8,601,270 B2    12/2013  Dupré
8,813,208 B2 *  8/2014  Blot-Lefevre ...... H04L 65/1006
                                                          726/10

2015/0163228 A1  6/2015  Li
2019/0178657 A1* 6/2019  Benbrahim ........ G01C 21/3476

FOREIGN PATENT DOCUMENTS

JP          20180302227         10/2018

OTHER PUBLICATIONS

"DocuSign," https:/en.wikipedia.org/wiki/DocuSign, Wikimedia Foundation, Inc., Retrieved on Jun. 27, 2019.
"How Do DocuSign Electronic Signatures Work," https://www.docusign.com/products/electronic-signature/how-docusign-works, DocuSign, Inc., Retrieved on Jun. 30, 2019.

* cited by examiner

*Primary Examiner* — Quazi Farooqui
(74) *Attorney, Agent, or Firm* — Weiss & Arons LLP; Michael A. Springs, Esq.

(57) ABSTRACT

Apparatus and methods for generating a unique token that can be imprinted on a document to attest to the verification of an executor's signature. The apparatus and methods may include a platform that may present a token electronically to the executor via a first electronic channel. The executor may use a registered device to capture a portion of the token, and transmit the portion from the registered device to the platform via a second channel to the platform. The platform may verify that the portion is registered to the executor. The platform may combine the portion with another portion of the token, and imprint the pair of combined portions on the document with another token.

22 Claims, 9 Drawing Sheets

E-CODE MULTI-IMPRINTS

BACKGROUND

Typical signature verification schemes control access to documents by requiring parties to log on to a signature platform based on a pre-arranged email address. Such schemes are vulnerable to "middleman attacks," in which a malfeasant intercedes between the platform and one of the parties. The interceding malfeasant with knowledge of such an email address can capture transmissions from the platform that are intended for one of the parties, and reroute the transmission to an unintended email account. The malfeasant can then exploit information or change the document.

Therefore, it would be desirable to provide apparatus and methods for securely executing an electronic document over a geographically distributed electronic communication network.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for securely executing an electronic document over a geographically distributed electronic communication network are provided.

The apparatus and methods may generate a unique pattern that can be imprinted on the document. The apparatus and methods may include a platform that may present the pattern electronically to a document executor via a first electronic channel. The executor may use a registered device to capture a portion of the pattern, and transmit the portion from the registered device to the platform via a second channel to the platform. The platform may verify that the portion is registered to the executor. The platform may combine the portion with another portion of the pattern, and imprint the pair of combined portions on the document with another pattern. When a higher level of signatory authority is required, the platform may present the pattern to a "super-executor." The super-executor may return along a different channel a different portion of the pattern. The platform may verify that the different portion is registered to the super-executor. The platform may then combine the portions of the executor and the super-executor with the over pattern, and imprint the document with the three-way combination to certify that the execution was verified as to identities of the executors and sufficient signatory power.

The term "executor" may include one who is designated to issue an instruction, an order, a request, or otherwise cause an act to be performed. The act of execution may include inscribing or applying a signature, a facsimile of a signature, or a digital element that has the effect of a signature. A "super-executor" may include an executor that has more executive or signatory authority than another executor. A "co-executor" may include one or more executors whose combined execution is required to perform an act of execution.

The platform may receive from an executor's device a special code taken from the device and then used to generate a token. The code may be tokenized by a splitter. Tokens from different registered executors may be combined into bonded tokens that may be imprinted on a document in addition to or in place of an electronic signature. The bonded token may be in the form of a watermark.

In some embodiments, each document that requires signature will have a unique pattern on it. The pattern may be generated based on pre-filled data input on the document. The receiver of the document may: a) use a registered device with camera, pointed at the pattern to receive a special one-time code; b) key that code into the screen to authenticate and apply their digital signature, d) depending on parameters such as dollar-amount limits, additional authentication steps may be applied such as a multi-pair entry sent to different executors, which may be registered to different devices.

In some embodiments, the generated code can be used to create a token on the device, and can carry authentication information such as location and time stamp which can be captured and retained with the completed documents. This token is then imprinted on the signature either as a tokenized string in place of the signature or as a watermark on in-line with the signature. Important for security and fraud prevention—because the document does not carry the image of a wet signature it cannot be copied and used elsewhere like on a fraudulent check. This process makes it more difficult for a bad guy to steal and then fake an authorized signature.

In some embodiments, the platform may split or combine codes with other parties to strengthen authorization and authentication. For example, a user could have a co-signer be part of the overall signature to confirm the executor's identity. The code could carry the requirement of two approvers, which may be specified at registration time.

The platform may include one or more of: a generator, a verifier, which may track signatures across the documents, an imprinter, which may effect the imprint as a watermark or replace a digital signature, and a combination/splitter engine, which may allow for single a imprint or multiple imprints The platform may electronically scan a document and based on the content determine one or more of what signature is needed, who needs to sign, and with what level authority.

The apparatus and methods may provide for the application to documents of unique signatures across multiple documents.

The apparatus and methods may be used for securely executing an action, an instruction, an authorization, a delegation, an approval or any other suitable executive act without a document. For example, the act may be performed by clicking on a control element. The control element may include textual information. The control element may include graphical information. The control element may be displayed on a user device. Actuation of the control element may convey the act to a verification platform.

The methods may include deriving tokens from a pattern. The methods may include receiving a document from an originator. The methods may include transmitting to an executor via a first channel: (a) the document; and (b) a first of the tokens. The methods may include transmitting to the executor via a second channel: (a) a request for execution; and (b) a second of the tokens. The methods may include verifying a response, by the executor, to the request. The methods may include subsequently imprinting on the document a combination of the first token and an other token. The methods may include subsequently returning the document to the originator.

The pattern may include a multi-dimensional data object. The data object may embody a graphical image. The first channel may include a traverse of a TCP/IP network. The first channel may include a traverse of a cellular telephone network. The first channel may include traverse of a WIFI network.

The second channel may: (a) be is distinct from the first channel; and (b) include a traverse of a TCP/IP network. The second channel may: (a) be distinct from the first channel; and (b) include a traverse of a cellular telephone network. The second channel may: (a) be distinct from the first channel; and (b) include a traverse of a WIFI network.

The first channel may include a first user device that is registered to the executor. The second channel may include a second user device that is registered to the executor.

The other token may be the second token.

The combination may include a tokenized string.

The combination may include a watermark.

The verifying may include receiving from the executor, via the second channel, a copy of the second token. The verifying may include transmitting to the executor, via the second channel, a first electronic code. The verifying may include receiving from the executor, via the first channel, a second electronic code. The verifying may include ascertaining that first and second codes are identical. The other token may be the second token.

The verifying may include receiving from the executor, via the first channel, a copy of the second token. The verifying may include ascertaining that copy matches the second token.

The second token may be present in the first token. The verifying may include receiving from the executor, via the second channel, a gesture. The gesture may include an executor hand movement. The gesture may include an executor finger movement. The gesture may include an executor cursor movement. The gesture may include an executor stylus movement. The movement may correspond to an outline of a graphical representation of a token or a part of a token. The gesture may include an executor GUI control element selection. The gesture may include capturing an image using a camera in telecommunication with a first channel. The gesture may include capturing an image using a camera in telecommunication with a second channel. The gesture may include a tracing of an image. The image may correspond to a token. The image may be part of a larger image that corresponds to a different token.

The gesture may correspond to the second token. The gesture may be a gesture that does not correspond to any element of the first token that is not also part of the second token. The verification may include ascertaining that gesture matches the second token. The other token may be the second token.

The gesture may be a gesture that includes no fewer than 90% of the elements of the second token. The gesture may be a gesture that includes no greater than 10% of the elements of the first token that are not also part of the second token.

The gesture may be a gesture that includes no fewer than 90% of the elements of the second token. The gesture may be a gesture that includes no greater than 10% of the elements of the first token that are not also part of the second token.

The methods may include, after the verifying and before the imprinting: (a) transmitting to the executor an authorization exception requiring an authorized super-executor; (b) receiving from the executor an identifier of the super-executor; (c) transmitting to the super-executor, via a third channel: (i) the document; (ii) the first token; (iii) the second token; and (iv) a third token The third token may be present in the first token. The verifying may include: (a) receiving from the super-executor, via a fourth channel, a gesture that: (i) corresponds to the third token; and (ii) does not correspond to any element of the first token that is not also part of the third token; and (b) ascertaining that the gesture matches the third token. The other token may include the third token.

The methods may include, after the verifying and before the imprinting: (a) transmitting to the executor a co-execution exception requiring a co-executor; (b) receiving from the executor an identifier of the co-executor; (c) transmitting to the co-executor, via a third channel: (i) the document; (ii) the first token; (iii) the second token; and (iv) a third token. The third token may be present in the first token. The verifying may include: (a) receiving from the co-executor, via a fourth channel, a gesture that: (i) corresponds to the third token; and (ii) does not correspond to any element of the first token that is not also part of the third token; and (b) ascertaining that gesture matches the third token. The other token may include the second token and the third token.

An exception may be triggered, in addition to, or in place of, one of the aforementioned exceptions, if the executor, super-executor or co-executor is determined to be located in a location outside a geographic region. The location may be determined using location services provided on a registered mobile device of the executor, super-executor or co-executor. The registered device may be configured to transmit the location concurrently with, or in a data packet that that includes, a token. The exception may provide the originator with an opportunity to waive the geographic requirement. The exception may provide the originator with an opportunity to postpone execution. The exception may provide the originator with an opportunity to cancel execution.

The apparatus and methods may include systems for securely executing a document over a geographically distributed electronic communication network. The system may include a generation engine. The system may include a registration engine. The system may include a process flow engine. The system may include a verification engine. The system may include an imprint engine. The system may include a combination/splitter engine.

The generation engine may be configured to generate tokens.

The registration engine may be configured to register an executor to the tokens. The registration engine may be configured to register the executor to a signature grade.

The process flow engine may be configured to receive the document from an originator. The process flow engine may be configured to identify any executors. The process flow engine may be configured to scan the document to determine the identities of the executors. The process flow engine may provide the originator with an electronic form. The electronic form may provide fields for entry by the originator of the names of the executors. The process flow engine may be configured to retrieve from machine readable memory signature grades corresponding to the executors.

The process flow engine may cause the registration engine to register all executors to a first of the tokens. The process flow engine may cause the registration engine to register each of the executor to one of a plurality of second tokens, each executor corresponding to a different one of the second tokens. The process flow engine may cause the registration engine to register each of the executor to one of a plurality of different signature grades, each executor corresponding to one of the signature grades.

The process flow engine may pass to the verification engine control of the document. The process flow engine may pass to the verification engine control of the the first tokens. The process flow engine may pass to the verification engine control of the second tokens. The process flow engine may pass to the verification engine control of the signature grades for each executor.

The verification engine may be configured to cause the imprint engine to embed a portion of the first token in the document, the portion corresponding to the first token less any part of the first token that is also part of the second token. The verification engine may be configured to transmit the document and embedded first token, via a first channel, to a first executor. The verification engine may be configured to transmit a request for signature, via a second channel, to the first executor, the request for signature including the first token, and the first token including the second token. The verification engine may be configured to receive a gesture, via the second channel, from the first executor. The verification engine may be configured to verify that the gesture corresponds to the second token. The verification engine may be configured to cause the combine/split engine to bind the second token to the portion of the first token to form a bound token. The verification engine may be configured to cause the imprint engine to imprint the bound token on the document.

Illustrative embodiments of apparatus and methods in accordance with the principles of the invention will now be described with reference to the accompanying drawings, which forma part hereof. It is to be understood that other embodiments maybe utilized and that structural, functional and procedural modifications or omissions may be made without departing from the scope and spirit of the present invention.

Figure 1:
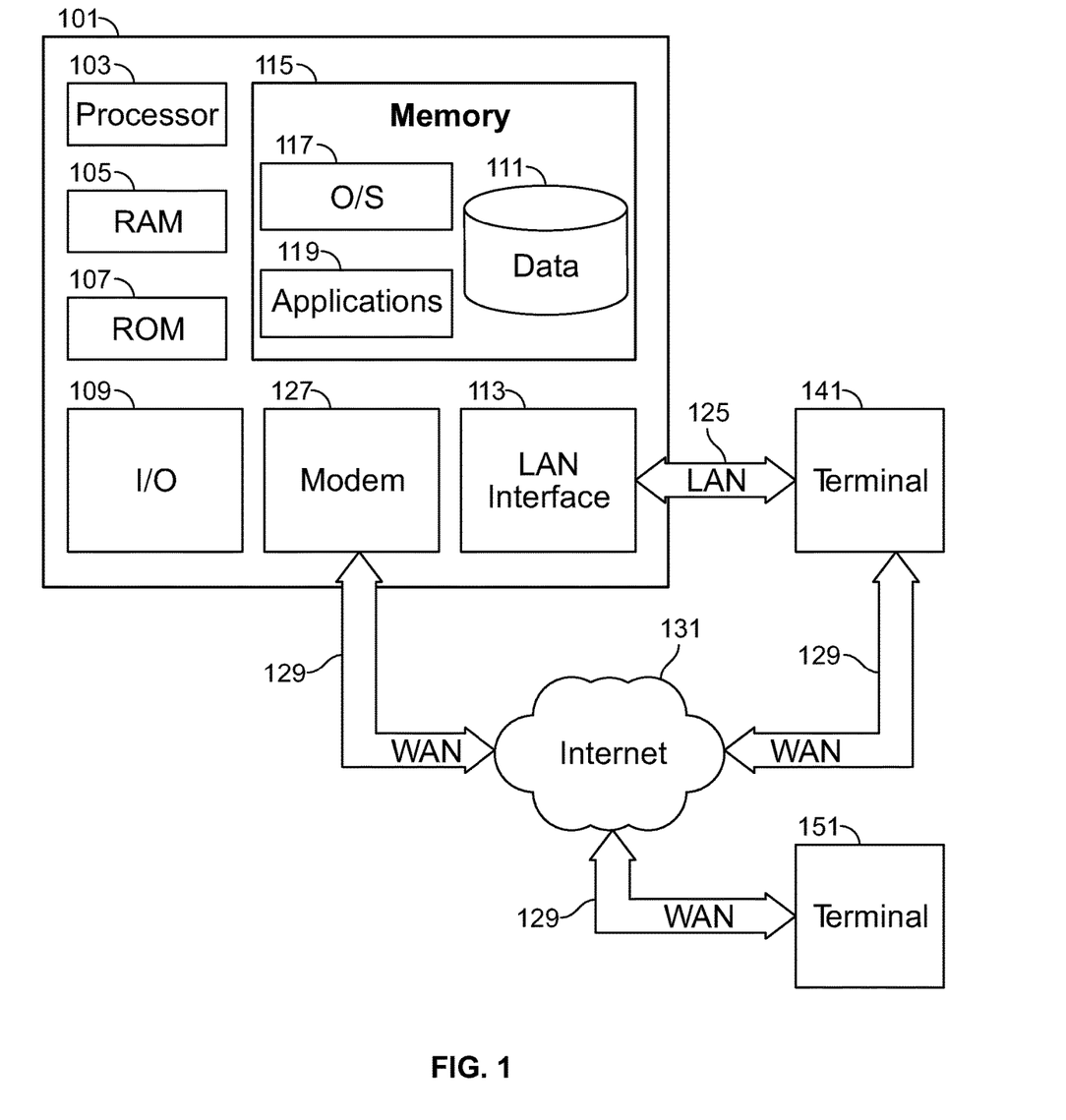
FIG. 1 shows illustrative apparatus that may be used in accordance with principles of the invention.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 17 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of the registration engine, generator engine, the process flow engine, the verification engine, the imprint engine, and the combination/splitter engine and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
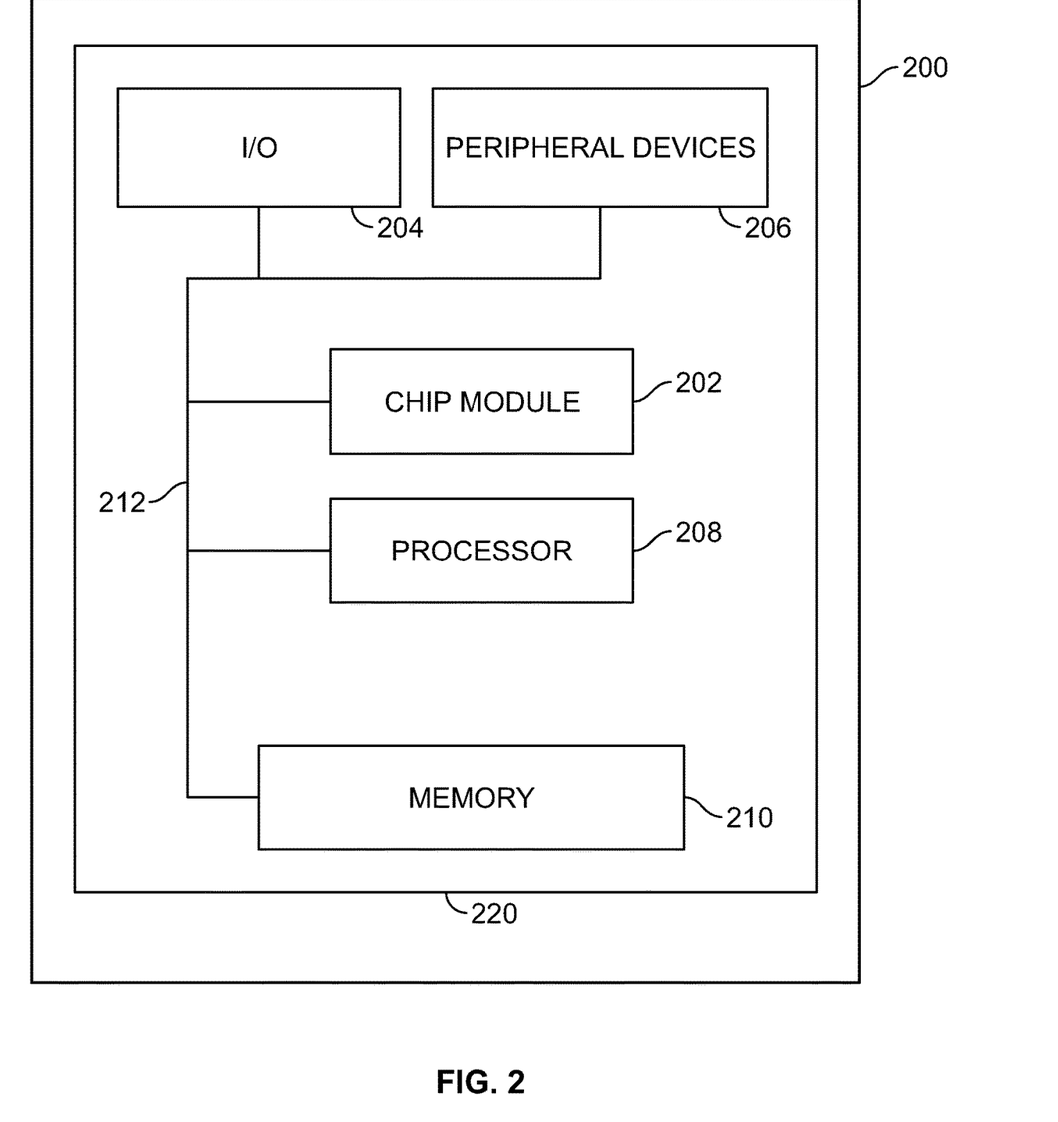
FIG. 2 shows illustrative apparatus that may be used in accordance with principles of the invention.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute imminence, permanence, edge weights, mapping, and perform other methods described herein; and machine-readable memory 210.

Machine-readable memory 210 may be configured to store in machine-readable data structures: tokens, patterns, codes, executor registration information, super-executor registration information, co-executor registration information and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
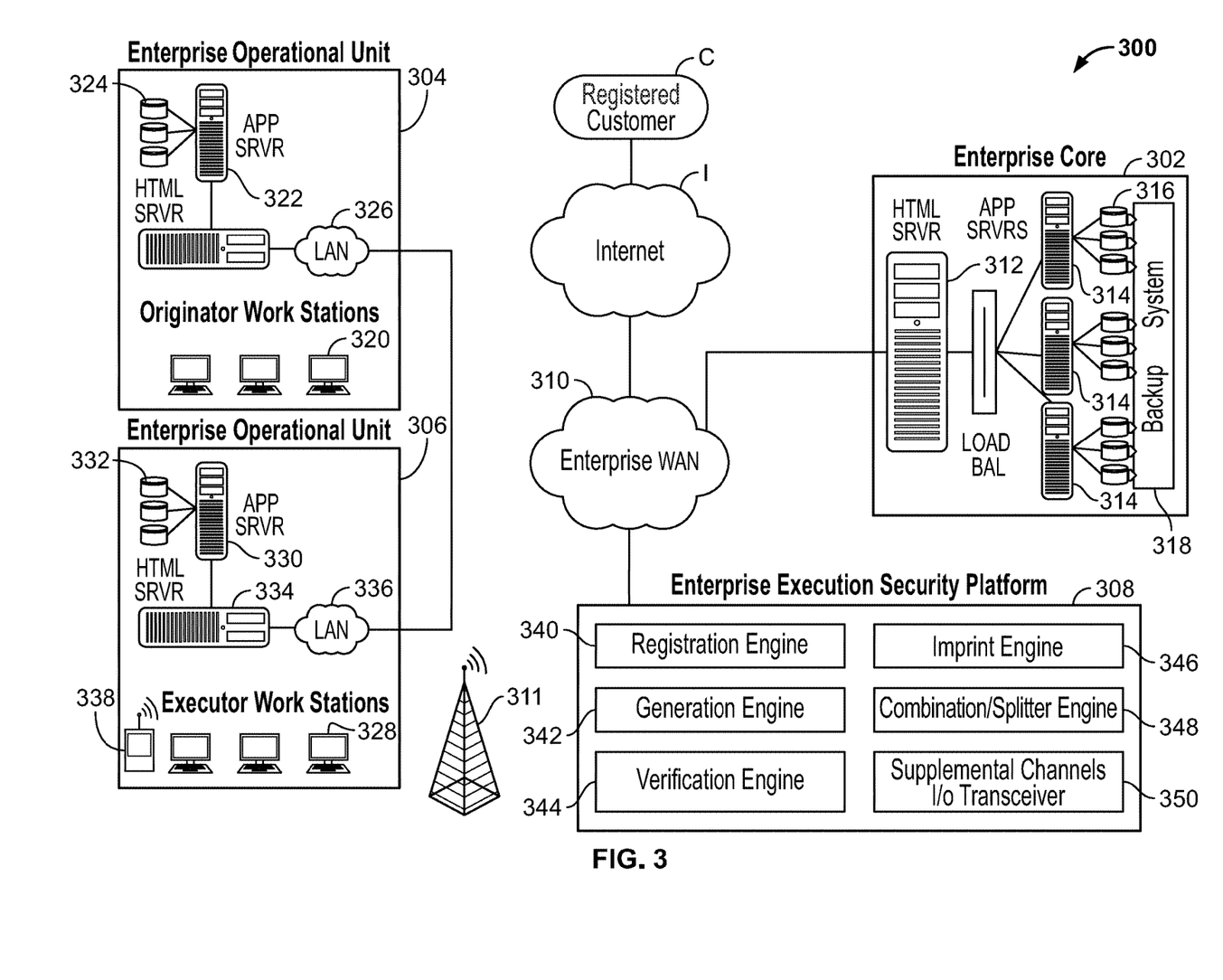
FIG. 3 shows illustrative apparatus in accordance with principles of the invention.
Figure 4:
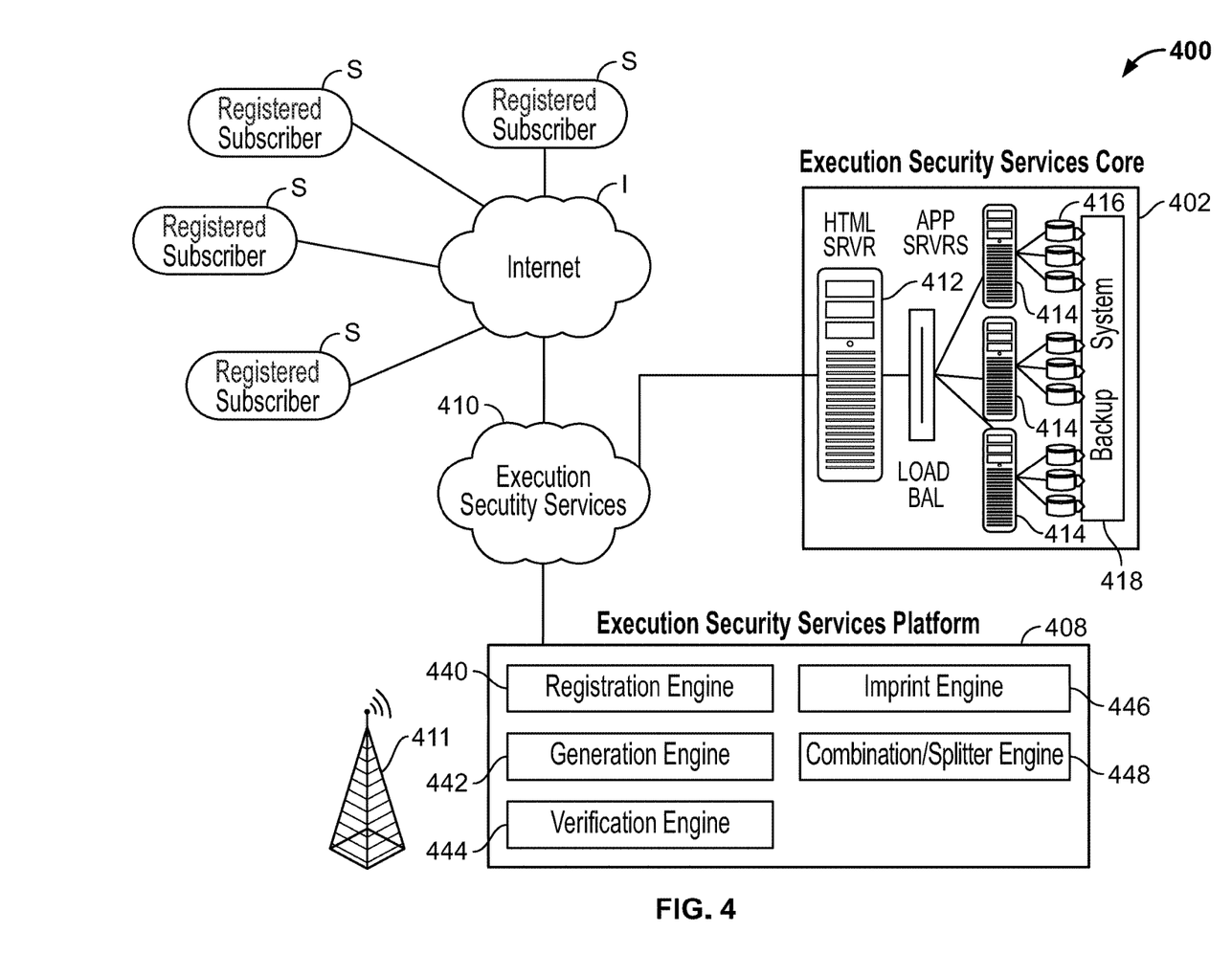
FIG. 4 shows illustrative apparatus in accordance with principles of the invention.

FIGS. 3-4 show illustrative architectures that may include one or more of the features show in or described in connection with FIGS. 1 and 2.

FIG. 3 shows illustrative architecture 300 for securely executing an electronic document over a geographically distributed electronic communication network. Architecture 300 may include enterprise core 302. Architecture 300 may include enterprise operational unit 304. Architecture 300 may include enterprise operational unit 306. Architecture 300 may include enterprise execution security platform 308. Architecture 300 may include enterprise WAN 310. Registered customer C may be in communication with WAN 310 via internet I. Architecture 300 may include access to cellular communication network 311.

Enterprise core 302 may include server 312 for exchanging execution related information. Execution related services may be provided by one or more applications served by application servers 314. Servers 314 may exchange applications and data with machine readable memory in data stores 316. Data stores 316 may be backed up by backup system 318.

Enterprise operational unit 304 may provide retail or business-to-business services to registered customer C. Unit 304 may include one or more originator workstations 318. Workstations 318 may be provided to document originators.

An originator may create a document using an application served by application server 322. Server 322 may exchange document information with data stores 324. HTML server 326 may provide the originator with the document and suitable forms and data for completing the document. Elements in operational unit 304 may be interconnected through LAN 326.

Enterprise operational unit 306 may provide support to operational unit 304. Unit 306 may include one or more executor workstations 328. Workstations 328 may be provided to document executors. An executor may receive a document and associated verification or authorization information using an application served by application server 330. Server 330 may exchange document information with data stores 332. HTML server 334 may provide the originator with the document and suitable forms and data for executing the document. Elements in operational unit 306 may be interconnected through LAN 336.

Operational unit 306 may include registered device 338. Device 338 may be in wireless communication with cellular network 311. Cellular network 311 may be in wireless connection with platform 308.

Platform 308 may include registration engine 340. Platform 308 may include generation engine 342. Platform 308 may include verification engine 344. Platform 308 may include imprint engine 346. Platform 308 may include combination/splitter engine 348. Platform 308 may include supplemental channels I/O transceiver 350. Transceiver 350 may provide second, third, fourth and nth channels for the transmission of token information in parallel with a first channel.

The originators and executors may be distributed geographically. Both originators and executors may be present at one or more of the operational units, such as 304 and 306.

FIG. 4 shows illustrative architecture 400 for securely executing an electronic document over a geographically distributed electronic communication network. Architecture 400 may include execution security services core 402. Architecture 400 may include enterprise execution security services platform 408. Architecture 400 may include execution security services WAN 410. Registered subscribers S may be in communication with WAN 410 via internet I. Architecture 400 may include access to cellular communication network 411.

Execution security services core 402 may include server 412 for exchanging execution related information. Execution related services may be provided by one or more applications served by application servers 414. Servers 414 may exchange applications and data with machine readable memory in data stores 416. Data stores 416 may be backed up by backup system 418.

Execution security services core 402 may provide document execution security services to registered subscribers S. Registered subscribers S may include document originators. Registered subscribers S may include one or more originator workstations (not shown). Registered subscribers S may include one or more executor workstations (not shown). An originator may upload a document for security services to core 402. Core 402 may provide to the originator document forms and other suitable forms for completing the execution of the document.

Registered subscribers S may include document executors. Registered subscribers S may include one or more executor workstations (not shown). Registered subscribers S may include one or more executor workstations (not shown). An executor may receive a document for execution from core 402. Core 402 may provide to the executor the document, one or more tokens, and other information for completing the execution of the document.

The originators and executors may be distributed geographically. Both originators and executors may be present at one or more subscribers S.

Each executors of subscribers S may have a registered device (not shown). The device may be in wireless communication with cellular network 411. Cellular network 411 may be in wireless connection with platform 408.

Platform 408 may include registration engine 440. Platform 408 may include generation engine 442. Platform 408 may include verification engine 444. Platform 408 may include imprint engine 446. Platform 408 may include combination/splitter engine 448. Platform 408 may include supplemental channels I/O transceiver 450. Transceiver 450 may provide second, third, fourth and nth channels for the transmission of token information in parallel with a first channel.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

For the sake of illustration, the steps of the illustrated processes will be described as being performed by a "system." The "system" may include one or more of the features of the apparatus that are shown in FIGS. 1-4 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Figure 5:
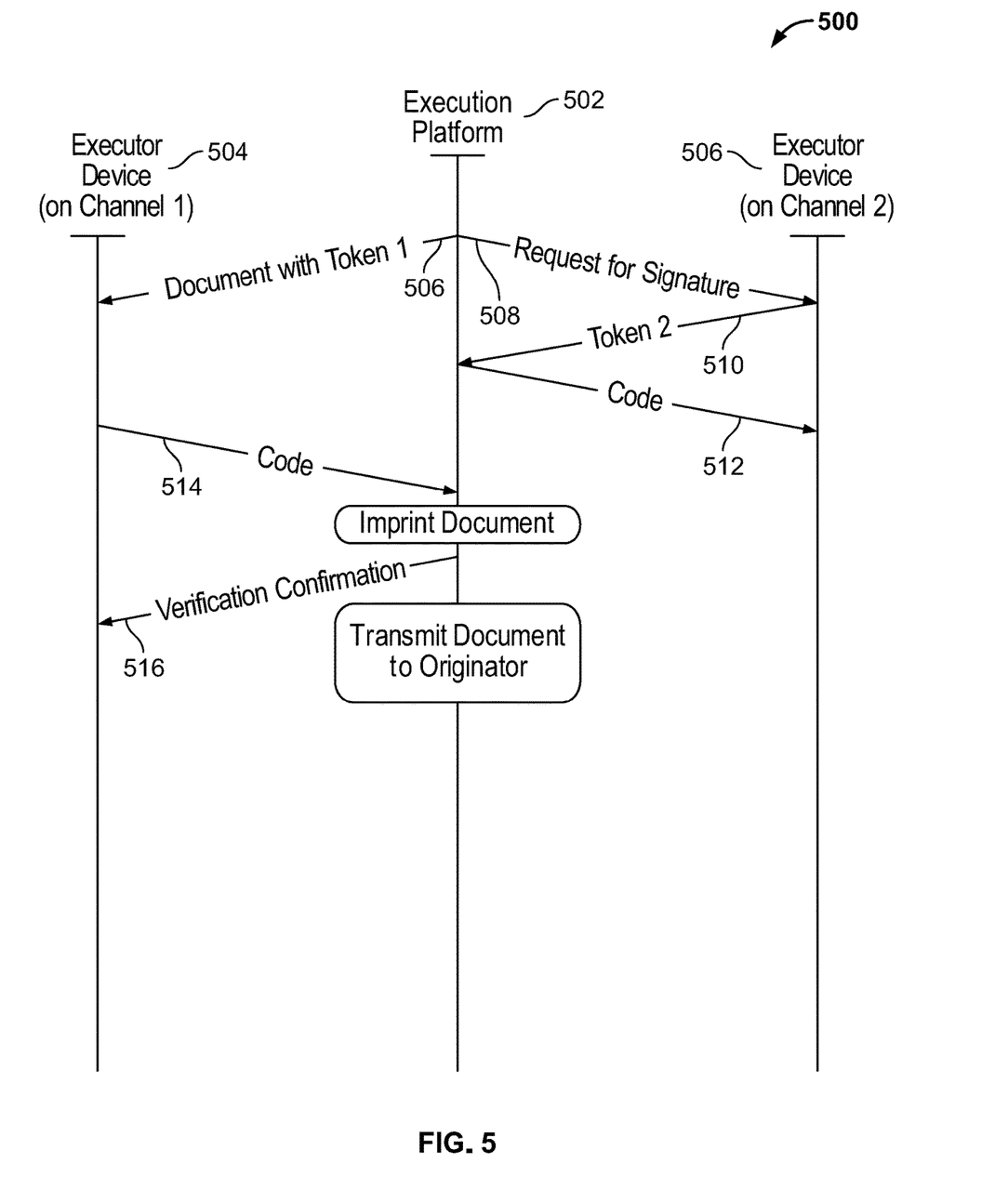
FIG. 5 shows illustrative communication in accordance with principles of the invention.

FIG. 5 shows illustrative sequence 500 of communications, which embodies methods in accordance with the principles of the invention. The communications may include communications between execution platform 502 and executor device 504, on channel "1". The communications may include communications between execution platform 502 and executor device 506, on channel "2".

In communication 506, platform 502 may transmit to executor device 504 a document containing token 1. In communication 508, platform 502 may transmit to executor device 506 a request for signature. In communication 510, executor device 506 may transmit to platform 502 token 2. In communication 512, platform 502 may transmit to executor device 506 a code. In communication 514, executor device 504 may transmit to platform 502 the code. Platform 502 may then imprint the document. In communication 516, platform 502 may provide verification confirmation to executor device 504. Platform 502 may then transmit the executed document to the originator.

Figure 6:
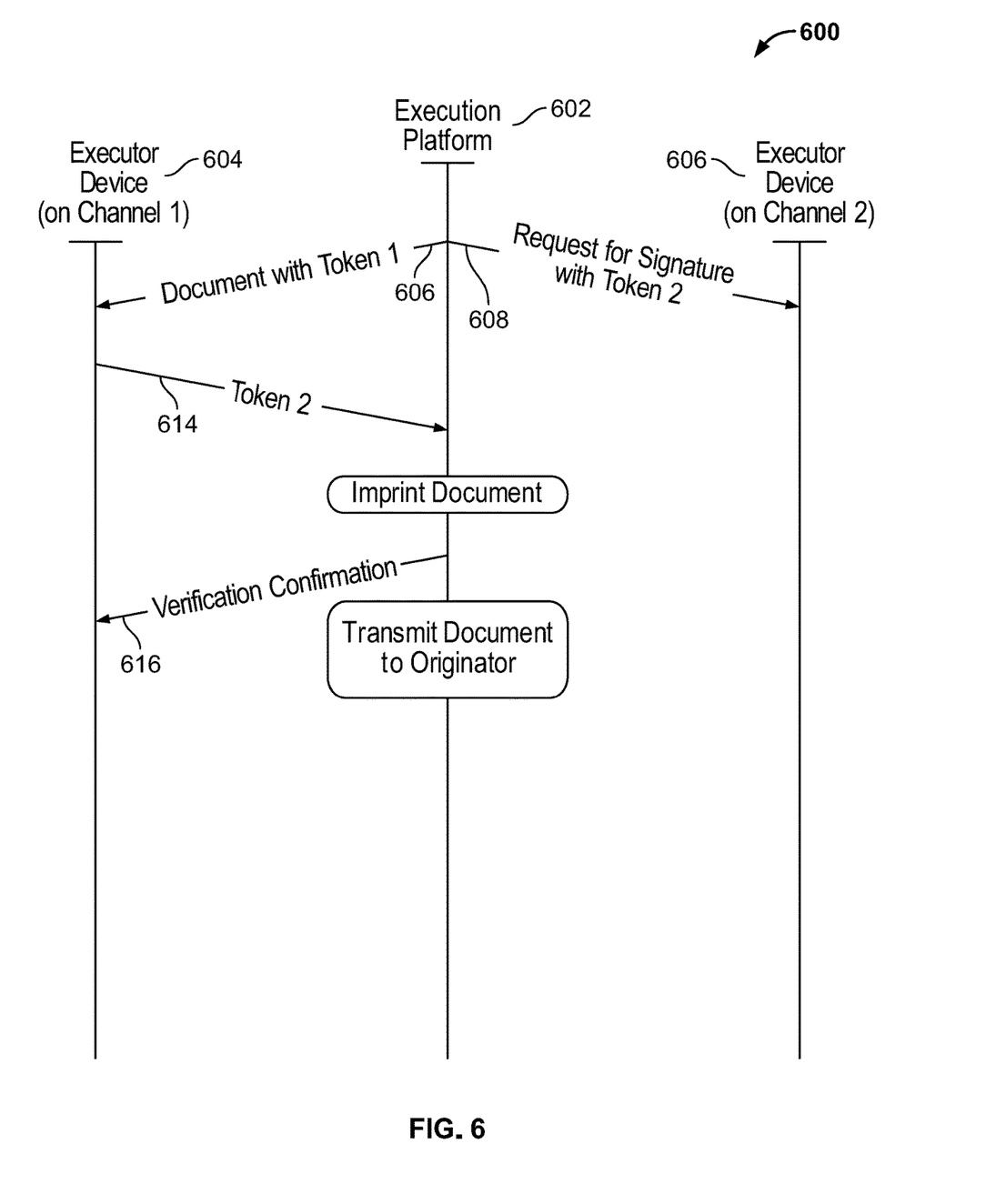
FIG. 6 shows illustrative communication in accordance with principles of the invention.

FIG. 6 shows illustrative sequence 600 of communications, which embodies methods in accordance with the principles of the invention. The communications may include communications between execution platform 602 and executor device 604, on channel "1". The communications may include communications between execution platform 602 and executor device 606, on channel "2".

In communication 606, platform 602 may transmit to executor device 604 a document containing token 1. In communication 608, platform 602 may transmit to executor device 606 a request for signature. The request may include token 2. In communication 614, executor device 604 may transmit to platform 602 token 2. Platform 602 may then imprint the document. In communication 616, platform 602 may provide verification confirmation to executor device 604. Platform 602 may then transmit the executed document to the originator.

Figure 7:
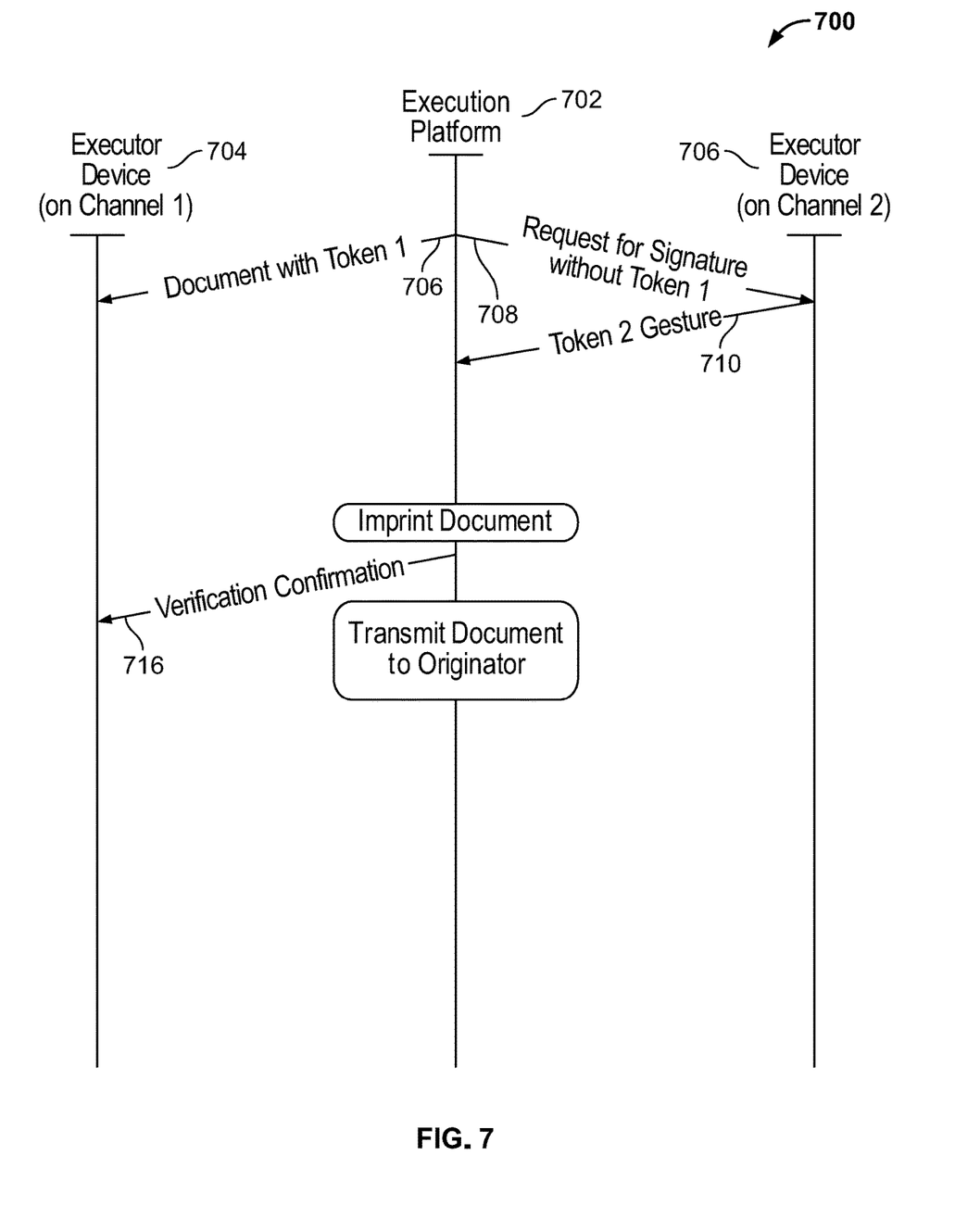
FIG. 7 shows illustrative communication in accordance with principles of the invention.

FIG. 7 shows illustrative sequence 700 of communications, which embodies methods in accordance with the principles of the invention. The communications may include communications between execution platform 702 and executor device 704, on channel "1". The communications may include communications between execution platform 702 and executor device 706, on channel "2".

In communication 706, platform 702 may transmit to executor device 704 a document containing token 1. In communication 708, platform 702 may transmit to executor device 706 a request for signature. The request may omit token 1. In communication 710, executor device 706 may transmit to platform 702 a token 2 gesture. Platform 702 may then imprint the document. In communication 716, platform 702 may provide verification confirmation to executor device 704. Platform 702 may then transmit the executed document to the originator.

Figure 8:
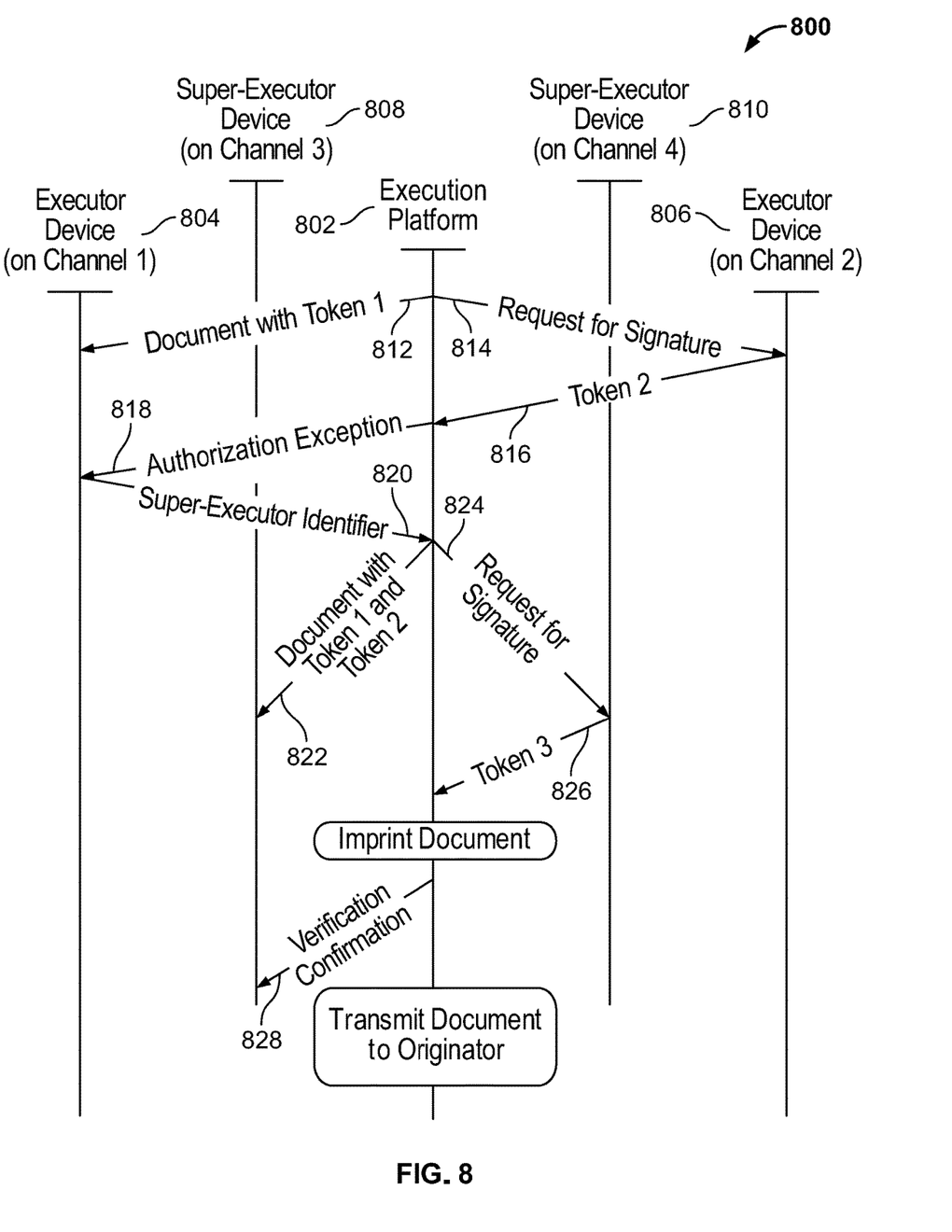
FIG. 8 shows illustrative communication in accordance with principles of the invention.

FIG. 8 shows illustrative sequence 800 of communications, which embodies methods in accordance with the principles of the invention. The communications may include communications between execution platform 802 and executor device 804, on channel "1". The communications may include communications between execution platform 802 and executor device 806, on channel "2". The communications may include communications between execution platform 802 and super-executor device 806, on channel "3". The communications may include communications between execution platform 802 and super-executor device 808, on channel "4".

In communication 812, platform 802 may transmit to executor device 804 a document containing token 1. In communication 814, platform 802 may transmit to executor device 806 a request for signature. In communication 816, executor device 806 may transmit to platform 802 token 2. In communication 818, platform 802 may transmit to executor device 804 an authorization exception. In communication 820, executor device 804 may transmit to platform 802 a super-executor identifier. In communication 822, platform 802 may transmit to super-executor device 808 the document with both token 1 and token 2. In communication 824, platform 802 may transmit to super-executor device 810 a request for signature. In communication 826, super-executor device 810 may transmit to platform 802 token 3. Platform 802 may then imprint the document. In communication 828, platform 802 may provide verification confirmation to executor device 804. Platform 802 may then transmit the executed document to the originator.

Figure 9:
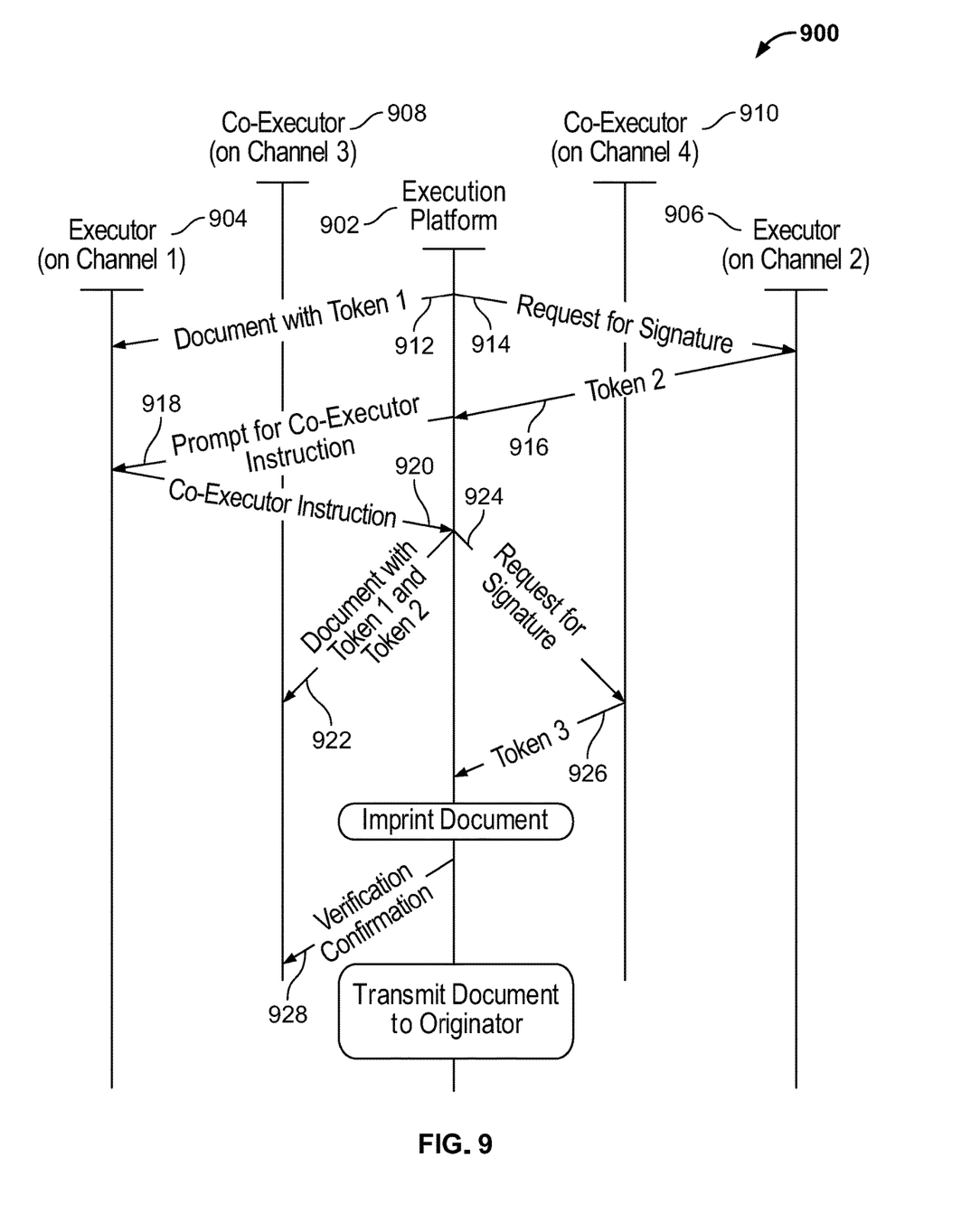
FIG. 9 shows illustrative communication in accordance with principles of the invention.

FIG. 9 shows illustrative sequence 900 of communications, which embodies methods in accordance with the principles of the invention. The communications may include communications between execution platform 902 and executor device 904, on channel "1". The communications may include communications between execution platform 902 and executor device 906, on channel "2". The communications may include communications between execution platform 902 and super-executor device 906, on channel "3". The communications may include communications between execution platform 902 and super-executor device 908, on channel "4".

In communication 912, platform 902 may transmit to executor device 904 a document containing token 1. In communication 914, platform 902 may transmit to executor device 906 a request for signature. In communication 916, executor device 906 may transmit to platform 902 token 2. In communication 918, platform 902 may transmit to executor device 904 a prompt for a co-executor instruction. The co-executor instruction may identify a pre-selected co-executor for the document. In communication 920, executor device 904 may transmit to platform 902 a co-executor instruction. In communication 922, platform 902 may transmit to super-executor device 908 the document with both token 1 and token 2. In communication 924, platform 902 may transmit to super-executor device 910 a request for signature. In communication 926, super-executor device 910 may transmit to platform 902 token 3. Platform 902 may then imprint the document. In communication 928, platform 902 may provide verification confirmation to executor device 904. Platform 902 may then transmit the executed document to the originator.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for securely executing an electronic document over a geographically distributed electronic communication network have been provided. Persons skilled in the art will appreciate that the present invention may be practiced by other than the described embodiments, which are presented for purposes of illustration rather than of limitation. The present invention is limited only by the claims that follow.

What is claimed is:

1. A method for securely executing a document over a geographically distributed electronic communication network, the method comprising:
    deriving tokens from a pattern;
    receiving the document from an originator;
    transmitting to an executor via a first channel:
        the document; and
        a first of the tokens;
    transmitting to the executor via a second channel, wherein the second channel is distinct from the first channel:
        a request for execution; and
        a second of the tokens; and,
    verifying a response, by the executor, to the request; and, then,
    imprinting on the document a combination of the first token and another token; and, then, returning the document to the originator.

2. The method of claim 1 wherein the pattern includes a multi-dimensional data object.

3. The method of claim 2 wherein the data object embodies a graphical image.

4. The method of claim 1 wherein the first channel includes a traverse of a TCP/IP network.

5. The method of claim 1 wherein the first channel includes a traverse of a cellular telephone network.

6. The method of claim 1 wherein the first channel includes a traverse of a WIFI network.

7. The method of claim 1 wherein the second channel:
    is distinct from the first channel; and
    includes a traverse of a TCP/IP network.

8. The method of claim 1 wherein the second channel:
    is distinct from the first channel; and
    includes a cellular telephone network.

9. The method of claim 1 wherein the second channel:
    is distinct from the first channel; and
    includes a traverse of a WIFI network.

10. The method of claim 1 wherein the first channel includes a first user device that is registered to the executor.

11. The method of claim 1 wherein the second channel includes a second user device that is registered to the executor.

12. The method of claim 1 wherein the other token includes the second token.

13. The method of claim 1 wherein the combination includes a tokenized string.

14. The method of claim 1 wherein the combination includes a watermark.

15. The method of claim 1 wherein:
    the verifying includes:
        receiving from the executor, via the second channel, a copy of the second token;
        transmitting to the executor, via the second channel, a first electronic code;
        receiving from the executor, via the first channel, a second electronic code; and
        ascertaining that first and second codes are identical; and
    the other token includes the second token.

16. The method of claim 1 wherein the verifying includes:
    receiving from the executor, via the first channel, a copy of the second token; and
    ascertaining that copy matches the second token.

17. The method of claim 1 wherein:
    the second token is present in the first token;
    the verifying includes:
        receiving from the executor, via the second channel, a gesture that:
            corresponds to the second token; and
            does not correspond to any element of the first token that is not also part of the second token; and
        ascertaining that gesture matches the second token; and
    the other token includes the second token.

18. The method of claim 1 wherein the gesture includes no fewer than 90% of the elements of the second token.

19. The method of claim 1 wherein the gesture includes no greater than 10% of the elements of the first token that are not also part of the second token.

20. The method of claim 1 wherein the gesture includes:
    no fewer than 90% of the elements of the second token; and
    no greater than 10% of the elements of the first token that are not also part of the second token.

21. The method of claim 1 further comprising, after the verifying and before the imprinting:
    transmitting to the executor an authorization exception requiring an authorized super-executor;

receiving from the executor an identifier of the super-executor;

transmitting to the super-executor, via a third channel:
- the document;
- the first token;
- the second token; and
- a third token;

wherein:
- the third token is present in the first token;
- the verifying includes:
  - receiving from the super-executor, via a fourth channel, a gesture that:
    - corresponds to the third token; and
    - does not correspond to any element of the first token that is not also part of the third token; and
  - ascertaining that gesture matches the third token; and
- the other token includes the third token.

22. The method of claim 1 further comprising, after the verifying and before the imprinting:

transmitting to the executor a co-execution exception requiring a co-executor;

receiving from the executor an identifier of the co-executor;

transmitting to the co-executor, via a third channel:
- the document;
- the first token;
- the second token; and
- a third token;

wherein
- the third token is present in the first token;
- the verifying includes:
  - receiving from the co-executor, via a fourth channel, a gesture that:
    - corresponds to the third token; and
    - does not correspond to any element of the first token that is not also part of the third token; and
  - ascertaining that gesture matches the third token; and
- the other token includes the second token and the third token.

* * * * *